3,320,217
NOVEL POLYMER AND METHOD OF OBTAINING THE SAME BY POLYMERIZATION OF A TRIMETHYLENE SULFIDE IN PRESENCE OF AN ALKALI METAL CATALYST
James T. Edmonds, Jr., Bartlesville, Okla., assignor to Phillips Petroleum Company, a corporation of Delaware
No Drawing. Filed Nov. 5, 1963, Ser. No. 321,421
12 Claims. (Cl. 260—79)

This invention relates to the polymerization of trimethylene sulfides. It also relates to moldable polymers obtained by the polymerization of trimethylene sulfides. In one of its aspects, the invention relates to the polymerization of trimethylene sulfides in the presence of an alkali metal catalyst. In another aspect of the invention, it relates to a moldable polymer obtained by the polymerization of trimethylene sulfides in the presence of an alkali metal catalyst. In a further aspect of the invention, it relates to the conversion of trimethylene sulfides to high molecular weight polymers useful as molding resins by contacting said sulfides with an alkali metal which, in one form of the invention and as a further aspect thereof, can be employed in the form of a dispersion and, in another form thereof, and as another aspect thereof, can be employed as a supported high surface material, for example as a thin film alkali metal catalyst of an inert solid.

Trimethylene sulfide, also named as thiacyclobutane, is presently available in semi-commercial to commercial quantities. One method which has been employed for the preparation of trimethylene sulfide is the reaction of either 1,3-dichloropropane or 1,3-dibromopropane with sodium sulfide. Literature references to this preparation disclose that finite amounts of polymeric trimethylene sulfide results when sodium sulfide and those dihalopropanes are contacted together. Because the polymer was formed in a reaction zone in which a competing reaction, that is, the reaction yielding trimethylene sulfide was occurring, the polymer had widely varying molecular weights and was not suitable as a molding resin.

It has now been found that trimethylene sulfides can be converted to polymers of high molecular weight preeminently useful as molding resins by contacting said sulfides with an alkali metal.

It is an object of this invention to provide a process for the polymerization of trimethylene sulfides. It is another object of this invention to provide a polymer derived by the polymerization of trimethylene sulfide. It is a further object of this invention to provide a catalytic operation for the conversion of trimethylene sulfide to a high molecular weight polymer. It is a further object of this invention to provide a novel high molecular weight polymer suitable as a molding resin.

Other aspects, objects and the several advantages of the invention are apparent from a study of this disclosure and the appended claims.

According to this invention, there is provided a process for the conversion of trimethylene sulfides to high molecular weight polymers which comprises contacting said sulfides with an alkali metal.

The trimethylene sulfides (or thiacyclobutanes) which are polymerized according to this invention are represented by the general formula:

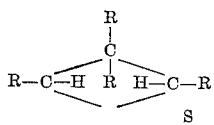

wherein each R is selected from the group consisting of hydrogen and alkyl, aryl, and cycloalkyl radicals, and combinations of said radicals, such as alkaryl, aralkyl, alkylcycloalkyl, arylcycloalkyl, cycloalkylalkyl, cycloalkylaryl, arylcycloalkylalkyl, and the like. The R's can contain substituent groups that are unreactive in the polymerization reaction of this invention, though I prefer to employ hydrocarbon radicals without such substituent groups. And, I prefer that where the R's are hydrocarbon radicals that the number of carbon atoms in each be in the range of 1 to 10, inclusive, and that the total number of carbon atoms in the trimethylene sulfide compound does not exceed 15.

The trimethylene sulfides and their preparation are known in the prior art, and the simplest member of this class, viz., trimethylene sulfide (or thiacyclobutane), is the preferred member of the class to be used in making the polymers of this invention, especially since it is presently commercially available. This latter compound can be prepared by the reaction of 1,3-dichloro or 1,3-dibromopropane with sodium sulfide. Another method of preparing it, and other members of the class, is by reacting a 3-chloropropyl mercaptan with a base such as sodium hydroxide.

Representative trimethylene sulfides coming within the scope of Formula I which can be used in the practice of this invention include:

Trimethylene sulfide
2-methyltrimethylene sulfide
3-methyltrimethylene sulfide
2,3-dimethyltrimethylene sulfide
2,4-dimethyltrimethylene sulfide
3,3-dimethyltrimethylene sulfide
2,3,4-trimethyltrimethylene sulfide
2,3,3,4-tetramethyltrimethylene sulfide
2-ethyltrimethylene sulfide
3-ethyltrimethylene sulfide
3,3-diethyltrimethylene sulfide
3-methyl-3-ethylmethylene sulfide
2-methyl-3,3-diethyltrimethylene sulfide
2-methyl-4-n-butyltrimethylene sulfide
2,4-di-n-hexyltrimethylene sulfide
2-sec-decyltrimethylene sulfide
2-ethyl-3-sec-decyltrimethylene sulfide
2-cyclopentyltrimethylene sulfide
3-cyclohexyltrimethylene sulfide
2,4-dicyclohexyltrimethylene sulfide
2-(4-methylcyclohexyl)trimethylene sulfide
2-phenyltrimethylene sulfide
3-p-tolyltrimethylene sulfide
2-(4-n-butylphenyl)trimethylene sulfide
2-benzyl-3-tert-butyltrimethylene sulfide
2-(3-cyclopentylphenyl)trimethylene sulfide
2-methyl-3-isopropyl-4-p-tolyltrimethylene sulfide
2-(3-phenylcyclopentyl)methyltrimethylene sulfide
2-naphthyltrimethylene sulfide and the like, including mixtures thereof.

Further according to the invention, the alkali metals which include sodium, potassium, lithium, rubidium, and cesium, can be employed as such or in the form of dispersions or as supported-surface catalytic materials.

When dispersion of the alkali metal, such as sodium, is employed, it can be employed as a dispersion in a hydrocarbon, for example in heptane, as is well known in the art. Further, when a high surface form or supported alkali metal catalyst is used, according to the invention, the alkali metal can be supported in a thin film on an inert solid such as salt, charcoal, clays, such as kieselguhr, sodium carbonate, and the like.

The polymerization process of this invention is carried out by contacting trimethylene sulfide with a form of an alkali metal as described above in the presence or absence of a diluent. Any diluent can be used which is inert with respect to the catalyst, trimethylene sulfide and the polymer of trimethylene sulfide resulting from the polymerization. Typical diluents include hydrocarbons, ethers and N-alkylated amides. Mixtures of two or more of these diluents can be used if desired. Some examples of specific diluents which can be employed are n-pentane, n-heptane, isooctane, cyclohexane, methylcyclohexane, benzene, toluene, xylene, diethyl ether, tetrahydrofuran, p-dioxane, dimethylformamide and N-methylpyrrolidone.

The polymerization of the invention can be effected at ordinary temperatures. Generally, the temperature will be within the range of from about 25 to about 150° C., or somewhat higher. Higher temperatures are generally now not preferred.

The pressure in the reaction zone can be autogeneous. In the preferred form of the invention, there is now employed an inert atmosphere, such as nitrogen. However, the nitrogen is not absolutely required.

ately (less than 1 minute at the temperature shown). Upon cooling, the reaction vessel was noted to be almost completely filled with polymer. The polymer was a very hard, gray-colored material.

EXAMPLE II

A series of runs is carried out in which a number of trimethylene sulfides are converted to polymers by polymerization with an alkali metal catalyst according to the present invention.

In these runs, alkali metals are employed in the presence of diluents chosen from hydrocarbons, ethers and N-alkylated amides. Catalyst concentrations varying from 0.25 to 10 weight percent, based on the trimethylene sulfide being polymerized are used, and polymerization temperatures ranging from 25 to 150° C. are employed. Details of these runs are set forth below in the form of a table.

| Run No. | Trimethylene Sulfide Compound | Catalyst | Temp., ° C. | Wt. Percent Catalyst | Diluent |
|---|---|---|---|---|---|
| 1 | Trimethylene sulfide | K | 25 | 0.25 | n-Heptane. |
| 2 | 2-methyltrimethylene sulfide | Li | 150 | 10 | Benzene. |
| 3 | 3-ethyltrimethylene sulfide | Na | 100 | 2.5 | Cyclohexane. |
| 4 | 2-phenyltrimethylene sulfide | K | 80 | 5.0 | Toluene. |
| 5 | 3-cyclohexyltrimethylene sulfide | Na | 100 | 5.0 | Tetrahydrofuran. |
| 6 | 2-p-tolyltrimethylene sulfide | K | 125 | 5.0 | Dimethylformamide. |
| 7 | 2-naphthyltrimethylene sulfide | Na | 130 | 5.0 | N-methyl-pyrrolidone. |
| 8 | 2,3,3,4-tetramethyltrimethylene sulfide | K | 105 | 7.5 | p-Dioxane. |
| 9 | Trimethylene sulfide | Rb | 50 | 1.0 | Xylene. |
| 10 | ...do | Cs | 50 | 1.5 | Diethyl ether. |

The alkali metal catalyst can be composed of a single alkali metal or any combination of alkali metals. The amount of the alkali metal catalyst employed can vary over a wide range. Generally, the catalyst and reactant are arranged so that the catalyst concentration will be in the range of from about 0.25 to about 10 weight percent based on the trimethylene sulfide in the reaction zone.

The reaction time will usually be quite short. Frequently, the reaction time will be less than about 30 minutes and can be less than 1 minute. However, reaction times of up to about two hours and higher can be employed depending upon the catalyst selected, the amount thereof, and other variables such as the rate of feed of the trimethylene sulfide and the temperature employed. Thus, the specific reaction time will depend upon the reaction variables, as will be understood by one skilled in the art who is in possession of this disclosure and has studied the same.

Following polymerization, the polymer can be recovered by several methods. Trimethylene sulfide polymer is generally insoluble in all of the above specified diluents, although it is soluble to a certain extent in the more polar solvents, such as dimethylformamide and N-methylpyrrolidone, at elevated temperatures. At room temperature, the polymer is generally insoluble in the diluents, and will precipitate out as formed when the polymerization temperature is below about 75° C. Otherwise, the reaction mixture can be cooled to cause precipitation of the polymer. The polymer can then be separated from the reaction mixture by such methods as filtration, decantation, centrifugation and the like. After separating the solid polymer from the reaction mixture, it is advantageous to wash the polymer with a suitable washing medium, such as methanol or ethanol. This washing step serves to remove occluded diluent and catalyst.

EXAMPLE I

A run was carried out in which trimethylene sulfide was polymerized over metallic sodium.

In this run, approximately 150 grams of trimethylene sulfide were charged to a reaction vessel and to this vessel was added approximately 5 percent by weight, based on the trimethylene sulfide, of sodium. The resulting mixture was heated to approximately 75 to 85° C., and a vigorous exothermic reaction occurred almost immedi- Following polymerization, the polymers are recovered by cooling the reaction mixture to 25° C. (if required) and filtering the polymers from the mixture. In all runs, polymeric material, ranging from soft, resinous materials to high molecular weight polymers are recovered.

The polymers produced according to this invention will range from soft, resinous materials to high molecular weight materials which can range from elastomeric to crystalline in nature, depending upon the particular trimethylene sulfide compound chosen, the conditions during polymerization, and the chosen alkali metal catalyst. The higher molecular weight polymers can be molded, extruded, etc., and are useful in a wide variety of applications, such as in films, fibers, pipes, and containers.

Reasonable variation and modification are possible within the scope of the foregoing disclosure and the appended claims to the invention the essence of which is that it has been found that a trimethylene sulfide can be polymerized in the presence of an alkali metal catalyst, as described, to obtain high molecular weight polymers useful, for example, as molding materials.

I claim:

1. A process for the polymerization of at least one of trimethylene sulfide and a substituted trimethylene sulfide having the following structural characteristics

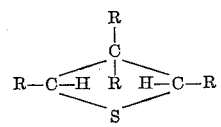

wherein each R is selected from the group of alkyl, aryl, cycloalkyl radicals, and combinations of said radicals, which comprises subjecting the same to the polymerizing action of an alkali metal polymerization catalyst.

2. A process according to claim 1 wherein the process is effected at a temperature in the range of from about 25 to about 150° C.

3. A process according to claim 2 wherein the amount of the catalyst is within the range of from about 0.25 to about 10 weight percent based on the sulfide, the reaction time is of the order of about up to two hours and the catalyst is present as one of a dispersion and a high surface form supported on an inert solid.

4. A process for the polymerization of trimethylene sulfide which comprises subjecting the same to the action of alkali metal as a catalyst.

5. A process for the polymerization of trimethylene sulfide which comprises subjecting the same to the action of a catalytic dispersion of an alkali metal.

6. A process for the polymerization of trimethylene sulfide which comprises subjecting the same to the action of an alkali metal catalyst dispersed in a diluent which is inert under the reaction conditions.

7. A process for the polymerization of trimethylene sulfide which comprises subjecting the same to the action of an alkali metal catalyst supported upon an inert solid catalyst support.

8. A process according to claim 1 wherein the R radicals each have 1 to 10 carbon atoms and the total carbon atoms in the sulfide is not in excess of 15.

9. A process for the polymerization of trimethylene sulfide which comprises subjecting the same to polymerization in the presence of metallic sodium catalyst at a temperature in the range of from about 25 to about 150° C.

10. A process for the polymerization of trimethylene sulfide which comprises subjecting the same to the action of an alkali metal polymerization catalyst selected from sodium, potassium, lithium, rubidium and cesium.

11. A polymer obtained by polymerizing in the presence of an alkali metal polymerization catalyst at least one of trimethylene sulfide and a substituted trimethylene sulfide having the following structural characteristics

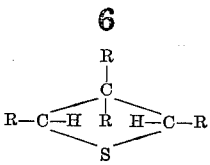

wherein each R is selected from the group of alkyl, aryl and cycloalkyl radicals, and combinations of said radicals.

12. A polymer obtained by polymerizing trimethylene sulfide in the presence of an alkali metal catalyst.

References Cited by the Examiner
UNITED STATES PATENTS

| | | | |
|---|---|---|---|
| 2,160,915 | 6/1939 | Schrieber | 260—327 |
| 3,222,326 | 12/1965 | Brodoway | 260—79 |

OTHER REFERENCES

Reid: Organic Chemistry of Bivalent Sulfur, vol. III, Chemical Publishing Co., Inc., New York, 1960, pages 19, 113, 114, and 124.

Bost et al.: Industrial and Engineering Chemistry, pages 526 to 528 (1933).

Chem. Ab., vol. II, page 784.

LEON J. BERCOVITZ, *Primary Examiner.*

M. I. MARQUIS, *Assistant Examiner.*